Patented Sept. 8, 1931

1,822,062

UNITED STATES PATENT OFFICE

WALTER SCHOELLER, OF BERLIN-WESTEND, AND HANS JORDAN, OF BERLIN-STEGLITZ, GERMANY, ASSIGNORS TO THE FIRM SCHERING-KAHLBAUM AKTIENGESELLSCHAFT, OF BERLIN, GERMANY

METHOD OF MANUFACTURING ALKYL ISOALKYL PHENOLS

No Drawing. Application filed October 25, 1927, Serial No. 228,687, and in Germany October 26, 1926.

Our invention refers to the production of alkyl isoalkyl phenols, and more especially thymol.

According to a method described in an application for patent of the United States filed by Hans Jordan on June 20, 1927, Serial No. 200,289, if m- or p-cresol and ketones are heated to a temperature slightly above room temperature in the presence of a condensing agent of acid character, there are obtained products of condensation having the formula

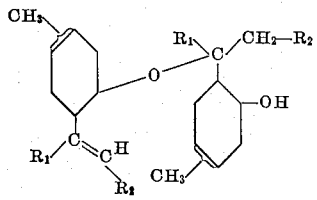

wherein $R_1$ is an alkyl radicle and $R_2$ hydrogen or an alkyl radicle, which, on being heated to 300° C., are decomposed into alkyl isopropylene phenols and alkylated cumaranes, the production of which forms the subject matter of another application for patent filed on the same day by Hans Jordan, Serial No. 200,290. These alkyl isopropylene phenols can then be isolated by fractional distillation.

In our application for patent Serial No. 200,297, filed June 20, 1927, we have shown how from these alkyl isopropylene phenols thymol and its isomers as well as the corresponding homologues can be obtained by hydrogenating the alkyl phenols in the side chain.

We have now found that the production of phenols etc. can be rendered more economical and advantageous, if the mixture of the products of decomposition is first hydrogenated and the products of hydrogenation are then separated by fractional distillation.

This new method involves the advantage that the tendency of polymerizing shown by the unsaturated phenols, which is the cause of a drop of yield when fractionating in accordance with the method claimed in the aforesaid application for patent Serial No. 200,290, is obviated by the hydrogenation. The distillation of the hydrogenation mixture occurs in a quantitative manner without leaving any residue, in contradistinction to the distillation of the mixture obtained in accordance with the process aforesaid described in patent application Serial No. 200,290, which according to the time consumed in the distillation and according to the temperature, leaves a residue consisting of varying quantities of polymer phenols.

In the hydrogenation of the mixture we prefer using a nickel catalyst. When two atoms hydrogen have entered into combination, the hydrogenation mixture is subjected to fractional distillation, preferably in vacuo.

Various changes may be made in the details disclosed in the foregoing specification without departing from the invention or sacrificing the advantages thereof.

We claim:—

1. The method of producing methyl isoalkyl phenols, comprising first condensing a cresol, in which the methyl and hydroxyl groups are combined with non-adjoining carbon atoms with a ketone in the presence of a condensing agent of acid character at a temperature slightly above room temperature, then heating the condensation product having the formula

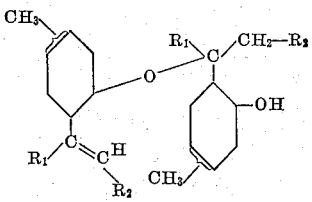

wherein $R_1$ is an alkyl radical, $R_2$ a hydrogen atom or an alkyl radical, to about 300° C. to decompose same, thereafter hydrogenating the mixture of the products of decomposition until two hydrogen atoms have entered into combination, and finally separating from the mixture the methyl isoalkyl phenols.

2. The method of producing methyl isopropyl phenols, comprising first condensing a cresol, in which the methyl and hydroxyl groups are combined with non-adjoining carbon atoms with acetone in the presence of a condensing agent of acid character at a temperature slightly above room temperature, then heating the condensation product having the formula

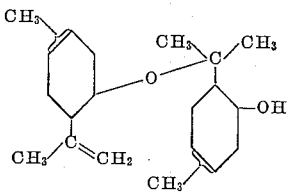

to about 300° C. to decompose same, thereafter hydrogenating the mixture of the products of decomposition until two hydrogen atoms have entered into combination, and finally separating from the mixture the methyl isopropyl phenols.

3. The method of producing thymol comprising first condensing m-cresol with acetone in the presence of a condensing agent of acid character at a temperature slightly above room temperature, then heating the product of condensation having the formula

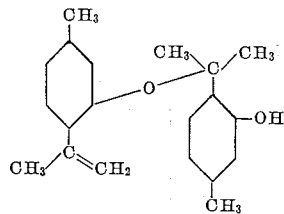

to about 300° C. to decompose same, thereafter hydrogenating the mixture of decomposition products thus obtained, until two hydrogen atoms have entered into combination, and finally separating the thymol from the mixture.

In testimony whereof we affix our signatures.

WALTER SCHOELLER.
HANS JORDAN.